Sept. 1, 1953
P. J. TOIEN
2,650,762
SLIDE RULE
Filed April 9, 1951
3 Sheets-Sheet 1
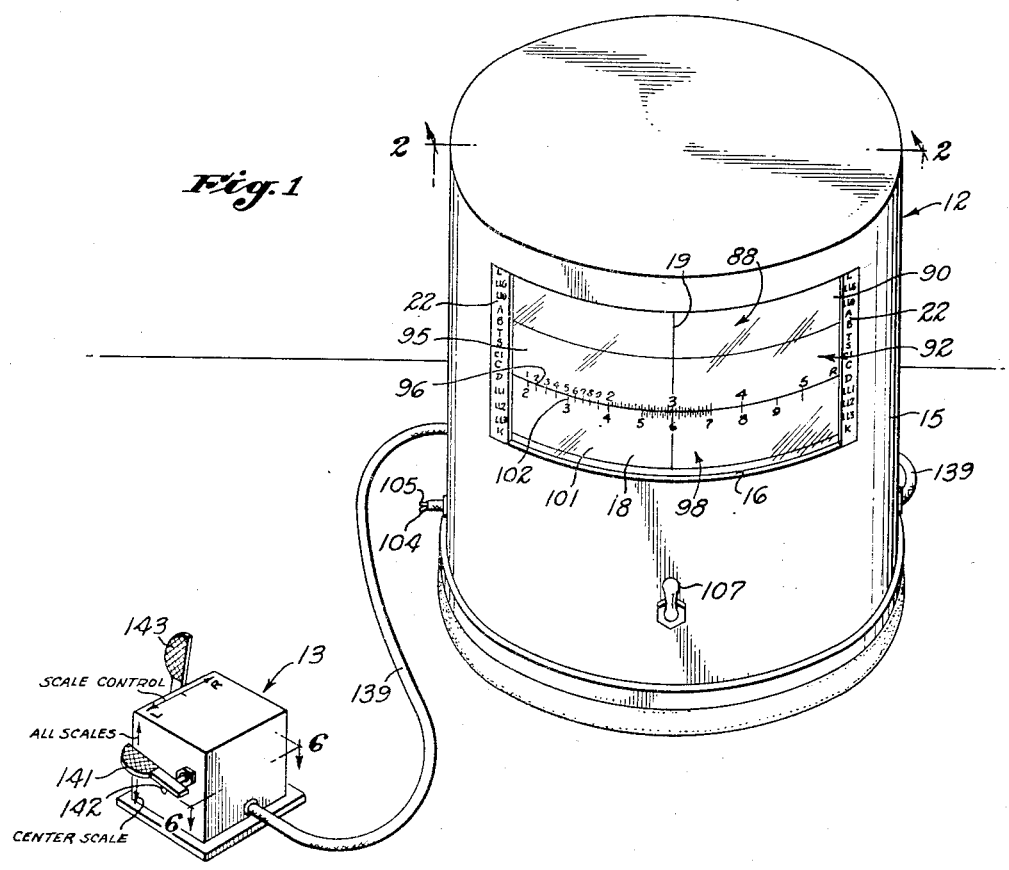
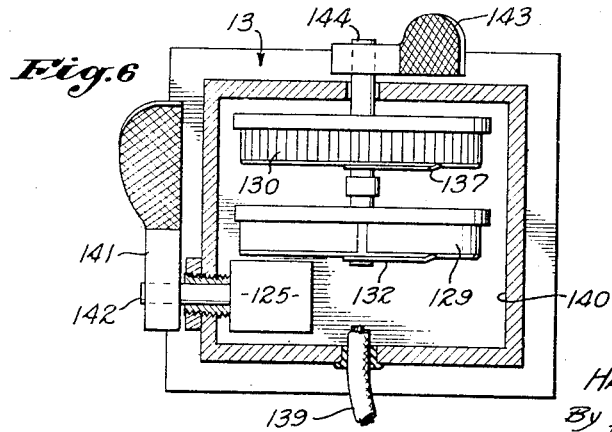
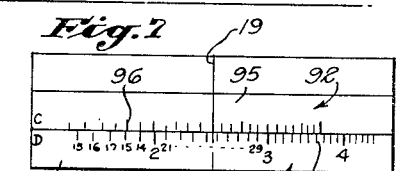
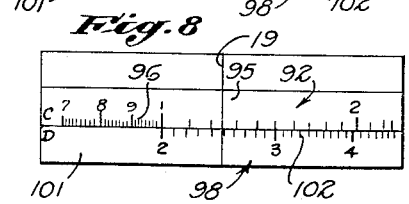
INVENTOR:
PAUL J. TOIEN
BY HIS ATTORNEYS
HARRIS, KIECH, FOSTER & HARRIS Sept. 1, 1953 P. J. TOIEN 2,650,762
SLIDE RULE
Filed April 9, 1951 3 Sheets-Sheet 2

INVENTOR:
PAUL J. TOIEN
BY HIS ATTORNEYS
HARRIS, KIECH, FOSTER & HARRIS

Sept. 1, 1953 P. J. TOIEN 2,650,762
SLIDE RULE

Filed April 9, 1951 3 Sheets-Sheet 3

INVENTOR:
PAUL J. TOIEN
BY HIS ATTORNEYS
HARRIS, KIECH, FOSTER & HARRIS

Patented Sept. 1, 1953

2,650,762

UNITED STATES PATENT OFFICE 2,650,762

SLIDE RULE

Paul J. Toien, Los Angeles, Calif.

Application April 9, 1951, Serial No. 219,974

10 Claims. (Cl. 235—79.5)

This invention relates to slide rules and more particularly to a slide rule which includes a plurality of differentially actuable members energizable by a motor associated therewith.

Conventional slide rules are usually of the "slip-stick" construction wherein the base member, having a central longitudinal groove therein, is provided with an elongated reciprocable member mounted in said groove, said base and said reciprocable member being longitudinally shiftable with respect to each other to permit calculations to be made by the utilization of the rule. Among the inherent disadvantages of such conventional construction is the fact that the use of a conventional slide rule necessitates the use of both hands so that it is not possible to simultaneously make and write down the calculations with the use of the conventional rule.

The conventional dial type rule slide rule wherein one flat disc is superimposed above the other, said discs being of decreasing diameters, also necessitates the use of two hands.

It is, therefore, a primary object of my invention to provide a slide rule which can be manipulated by the use of one hand and which thus permits the user thereof to make notes of his calculations while actuating the slide rule.

An additional object of my invention is the provision of a slide rule which is constituted by a plurality of differentially actuable members energizable by a motor associated therewith, the differential actuation of the plurality of members being controllable by first control means which is adapted to energize the plurality of members simultaneously and a second control means which is adapted to cause the differential actuation of at least one of said members with respect to others of said members.

Another object of my invention is the provision of a slide rule which includes a plurality of superimposed, differentially actuable members having provided on the peripheral portions thereof conventional slide rule scales, said members being housed in a housing which has a viewing window therein and being energizable by a motor associated therewith and mounted in said housing.

A further object of my invention is the provision of a slide rule of the aforementioned type which includes a plurality of substantially cylindrical members having scales mounted upon the peripheral portions thereof, the slide rule incorporating a motor which has associated therewith a primary drive and a plurality of secondary drives, said secondary drives being simultaneously or differentially actuable to cause the simultaneous or differential movement of the members with which they are associated.

An additional object of my invention is the provision of a slide rule of the aforementioned type which includes a plurality of juxtaposed, rotatable scales, said scales having associated therewith a primary drive and a plurality of secondary drives, said secondary drives being simultaneously or differentially actuable to cause the simultaneous or differential actuation of said scales, at least one of said scales being continually and operatively connected to a motor constituting the source of energy for said slide rule.

Another object of my invention is the provision of a slide rule of the aforementioned type in which the differential energization of the scales is accomplished by the provision of brake means associated with at least one of the secondary drives so that the energization of said secondary drive can be prevented while others of said secondary drives are energized.

A further object of my invention is the provision of a slide rule of the aforementioned type in which some of the secondary drives are connected to the primary drive by clutch means, said clutch means being engageable with said primary drive to accomplish the simultaneous energization of all of said drives to permit the concomitant rotation of all of the scales associated with said secondary drives.

One of the inherent disadvantages of the conventional slide rule is the fact that such slide rules are not immediately available for use since they must be kept in the pocket or on the desk of the user and are frequently subject to being mislaid.

It is an additional object of my invention to provide a slide rule which includes a primary housing adapted to be disposed at a remote point upon the desk of the user of the slide rule where it can be readily viewed by the user and where it is immediately available for use.

A further object of my invention is the provision of a slide rule of the aforementioned type which, while it is positioned at a point remote from the user, includes a second housing having embodied therein control means adapted to permit the remote actuation and control of the slide rule.

A further object of my invention is the provision of a slide rule of the aforementioned type which includes first control means adapted to cause the concomitant energization of the scales mounted in the primary housing, said first control being adapted to cause the movement of the scales in opposite directions at the will of the user of the slide rule.

An additional object of my invention is the provision of a slide rule of the aforementioned type which includes a second control adapted to cause the differential actuation of the scales of the slide rule so that one or more of the scales can be restrained from movement during movement of others of the scales.

Another object of my invention is the provision of a slide rule which is relatively simple to manufacture, includes a minimum number of component parts and can be readily maintained and repaired.

Other objects and advantages of my invention will be apparent from the following specification and the accompanying drawings, which are for the purpose of illustration only, and in which:

Fig. 1 is a perspective view of a slide rule constructed in accordance with my invention;

Fig. 6 is an enlarged, transverse, partly sectional view taken on the broken line 6—6 of Fig. 1; and Figs. 7 and 8 are graphic representations of typical scales showing the manner in which a simple calculation may be made by the utilization of the slide rule of my invention.

Figure 2:
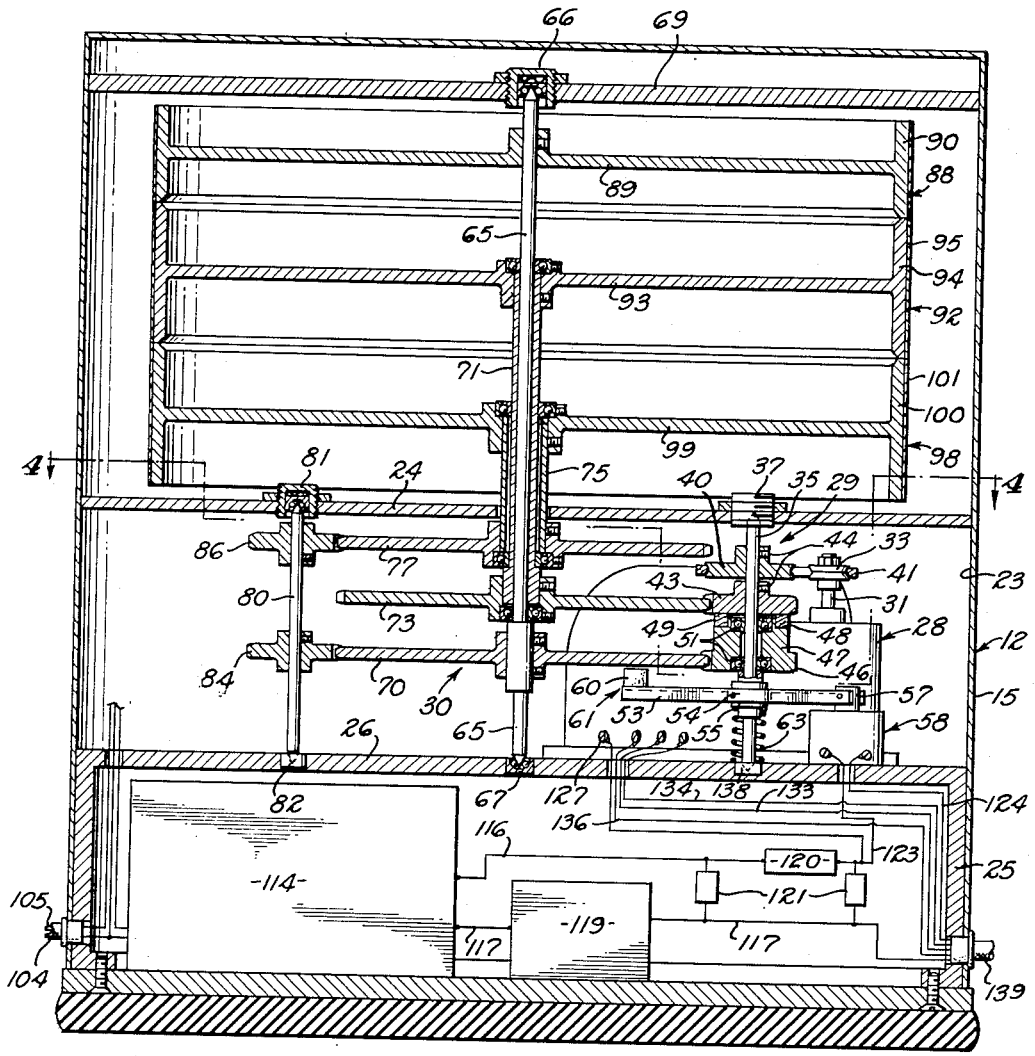
Fig. 2 is a vertical, sectional view taken on the broken line 2—2 of Fig. 1.
Figure 3:
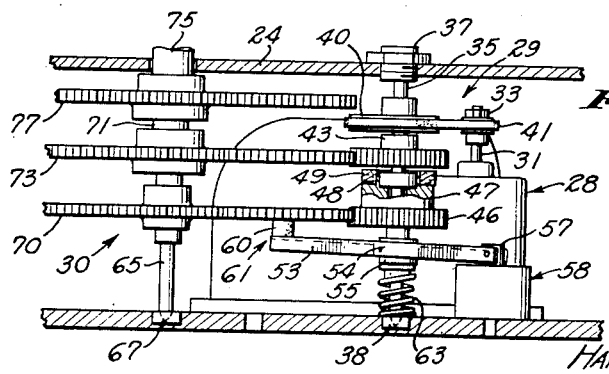
Fig. 3 is an enlarged, fragmentary view of the primary drive and portions of the secondary drives which constitute a portion of the slide rule of my invention.
Figure 4:
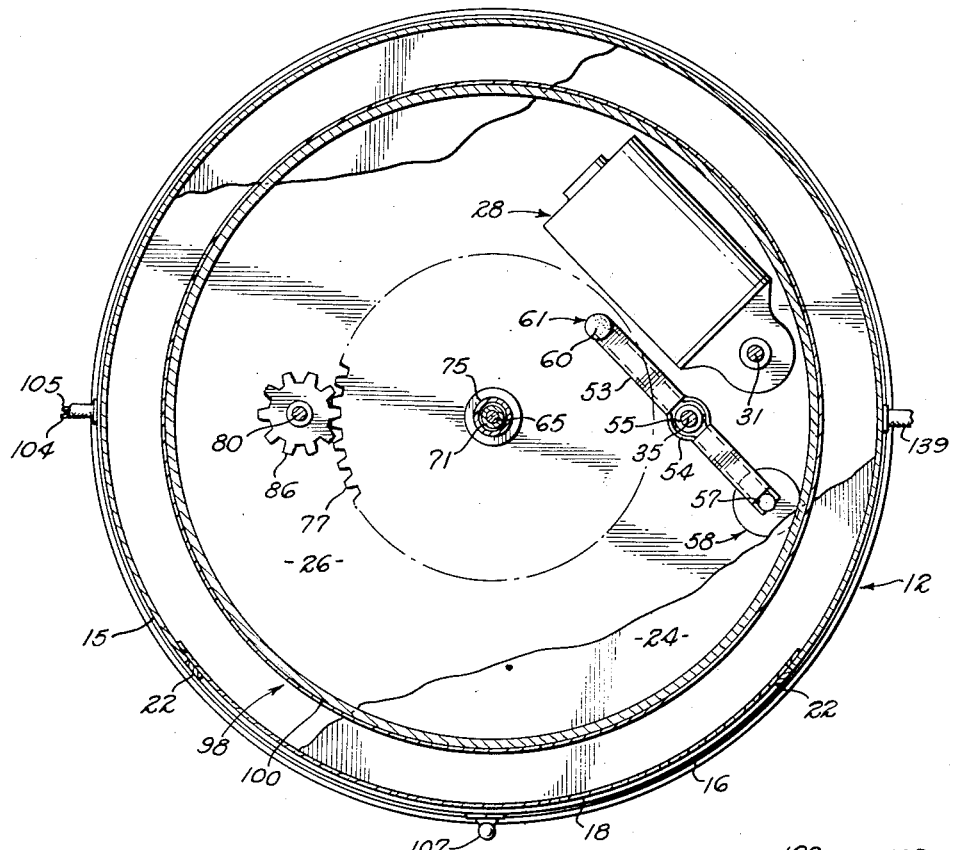
Fig. 4 is a transverse, partly sectional view taken on the broken line 4—4 of Fig. 2.

Referring to the drawings and, more particularly, to Fig. 1 thereof, I show a slide rule 10 constructed in accordance with my invention and including a first, remotely positioned, scale containing housing 12 and a second, control housing 13. Although my invention is described as embodied in first and second housings 12 and 13, respectively, so that the remotely positioned housing 12 and the contents thereof may be controlled from the control housing 13 juxtaposed to the user of the slide rule 10, it is conceivable that the controls, to be described in greater detail below, embodied in the control housing 13 be installed in the first housing 12, if the necessity therefor should arise. However, it is an important feature of my invention that the first housing 12 and the mechanism embodied therein are adapted to be positioned at a point remote from the user of the device and to be controllable from the relatively small control housing 13.

The first housing 12 is substantially cylindrical in configuration and includes a side wall 15 provided with a viewing opening 16. Supported across the viewing opening 16 is a window 18 formed of glass, plastic, or similar material and having medially disposed thereupon a reference line 19. Although the reference line 19 is shown as borne upon the window 18, it is conceivable that equivalent points of reference be provided upon the housing proper adjacent the viewing opening 18 and it is not intended that the invention be limited to the specific type of reference line shown. Mounted upon the side wall 15 and positioned at opposite ends of the viewing opening 16 are vertical panels 22 which bear upon their front surfaces indicia adapted to designate the various scales, to be described in part below, which constitute a portion of the slide rule of my invention.

The wall 15 of the first housing 12, as best shown in Fig. 2 of the drawings, defines a chamber 23 which is substantially bisected by a transverse intermediate partition 24 and which is adapted to receive in its lower portion an enclosure 25 whose upper wall 26 provides a mounting plate for various elements of the slide rule mechanism, in a manner which will be described in greater detail below. Supported upon the upper wall 26 of the enclosure 25 are an electric motor and reduction gear 28 which constitute the source of power for the slide rule 10 and which are operatively connected by means of a primary drive indicated generally at 29 to a plurality of secondary drives indicated generally at 30.

Incorporated in and constituting a portion of the primary drive 29 is a reduction gear shaft 31 associated with the motor 28 upon the upper end of which is mounted a pulley 33. Positioned adjacent the motor 28 is a primary drive shaft 35, said drive shaft having its upper end supported in a bearing 37 in the intermediate partition 24 and its lower end supported in a bearing 38 in the upper wall 26 of the enclosure 25. Fixed upon the primary drive shaft 35 adjacent the upper end thereof is a pulley 40 upon which is entrained a belt 41 which connects it to the pulley 33 on the shaft 31 to establish a driving connection between the motor 28 and the primary drive shaft 35. Thus, when the motor 28 is energized, in a manner to be described in greater detail below, the rotation of the shaft 31 is accompanied by concomitant and equal rotation of the primary drive shaft 35. Fastened on the primary drive shaft 35 immediately below the pulley 40 is a first pinion 43, said pinion being rotatable by the primary drive shaft 35 concomitantly with the rotation of the pulley 40. The pulley 40 and the pinion 43 are fixed against rotation with respect to the primary drive shaft 35 by means of set screws 44, or similar fasteners.

Mounted on the primary drive shaft 35 below the first pinion 43 is a second pinion 46, said second pinion being vertically reciprocable on the primary drive shaft 35 and having formed integrally therewith upon the upper surface thereof a cylindrical boss 47, said boss providing at its upper end an annular shoulder 48 adapted to receive a clutch annulus 49 formed of brake material and adapted to act as a clutch against the under side of the first pinion 43. The second pinion 46 is supported for reciprocation on the primary drive shaft 35 by means of ball bearings 51.

Disposed beneath the second pinion 46 is a lever 53, said lever providing a yoke 54 intermediate its ends. Pivotally suspended in the yoke 54 is a sliding collar 55 which is reciprocable on the primary drive shaft 35 and has its upper end engaging the lowermost of the ball bearings 51 on which the second pinion 46 is mounted. One of the ends of the lever 53 is pivotally secured to the upper end of the armature 57 of a solenoid 58 while there is secured to its opposite end a brake pad 60 which constitutes a brake 61 for a purpose which will be described in greater detail below.

Disposed below the yoke 54 of the lever 53 is a compression spring 63, said spring having its upper end seated upon the under side of the collar 55 and its lower end seated upon the upper wall 26 of the enclosure 25 adjacent the bearing 68. Thus, it can be seen that the compression spring 63 biases the sliding collar 55 upwardly on the primary drive shaft 35 causing the concomitant upward movement of the second pinion 46 and the engagement of the clutch annulus 49 with the under side of the first pinion 43 to establish a driving connection between the first pinion and the second pinion 46 so that the second pinion 46 may be driven thereby. However, when the solenoid 58 is energized, in a manner to be described in greater detail below, the armature 57 thereof is drawn downwardly to draw the end of the lever 53 pivotally connected thereto downwardly and to urge the sliding collar 55 mounted in the yoke 54 downwardly against the bias of the compression spring 63, permitting the second pinion 46 to slide downwardly on the primary drive shaft 35 and disengaging the clutch annulus 49 from the under side of the first pinion 43 to break the driving connection between the first pinion 43 and the second pinion 46.

Positioned centrally of the chamber 23 and constituting a portion of the first secondary drive is a first secondary drive shaft 65 whose upper and lower ends are mounted, respectively, in bearings 66 and 67 which, in turn, are mounted, respectively, in an upper, transverse partition 69 and in the upper wall 26 of the enclosure 25. Affixed to the first secondary drive shaft 65 adjacent its lower end is a first spur gear 70 which is in mesh with the second pinion 46 on the primary drive shaft 35. Supported upon the first secondary drive shaft 65 is a second secondary drive shaft 71 which encompasses the first secondary drive shaft 65 and has its upper and lower ends terminating, respectively, at points substantially below and above the upper and lower ends of the first secondary drive shaft 65. Secured to the second secondary drive shaft 71 at the lowermost end thereof is a second spur gear 73 which is in mesh with the first pinion 43 mounted on the primary drive shaft 35. A third, secondary drive shaft 75 encompasses a portion of the second secondary drive shaft 71 and has secured to its lowermost end a third spur gear 77, it being noted that the first and third spur gears 70 and 77 constitute the lower and upper gears while the second spur gear 73 constitutes the intermediate spur gear.

Spaced from but having its longitudinal axis oriented substantially in parallelism with the secondary drive shafts 65, 71 and 75, is a countershaft 80 the upper and lower ends of said shaft being journaled, respectively, in bearings 81 and 82, supported, respectively, in the intermediate partition 24 and in the upper wall 26 of the enclosure 25. Mounted on the countershaft 80 for rotation therewith is a counter pinion 84, said pinion 84 being in mesh with the first spur gear 70 so that the rotation of the spur gear 70 is communicated to the counter pinion 84 and then to the countershaft 80. Fixed on the countershaft 80 adjacent the upper end thereof is a second counter pinion 86 which is maintained in mesh with the third spur gear 77.

Secured to the first secondary drive shaft 65 adjacent the upper end thereof is a first rotatable member 88 of substantially cylindrical configuration which has a transverse mounting web 89 upon which is provided a peripheral, vertical flange 90 adapted to bear a circular scale providing indicia, not shown. Secured to the uppermost end of the second secondary drive shaft 71 is a second rotatable member 92 which includes a mounting web 93 having a vertical flange 94 provided thereupon which provides a mounting for a scale 95 bearing indicia indicated generally at 96 (Fig. 1). Fastened to the uppermost end of the third secondary shaft 75 is a third rotatable member 98 which includes a mounting web 99 provided with a peripheral, vertical flange 100 upon which is supported a scale 101 having indicia 102 thereupon. Although only the C and D scales, as best shown in Fig. 1 of the drawings, are represented for purposes of convenience, it should be understood that it is intended to provide the conventional scales customarily incorporated in slide rules on the flanges 90, 94 and 100 of the first, second and third members 88, 92 and 98.

Figure 5:
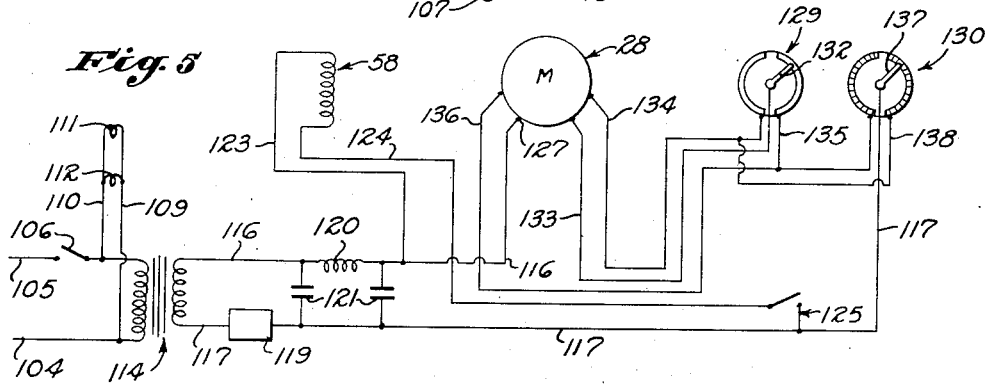
Fig. 5 is a circuit diagram showing the organization of the electrical components of my invention.

The electrical circuit of the slide rule 10 is shown in Fig. 5 of the drawings and includes power input leads 104 and 105, the power input lead 105 having a main switch 106 therein which is controlled by a switch lever 107 mounted in the wall 15 of the first housing 12. Tapped into the power leads 104 and 105 are leads 109 and 110 which conduct current to lamps 111 and 112 juxtaposed to the viewing opening 16 in the wall 15 of the first housing 12 to illuminate the scales on the rotatable members 88, 92 and 98. The leads 104 and 105 are connected to a transformer 114, the secondary of which is connected to leads 116 and 117. Connected in series in the lead 117 is a selenium rectifier 119, a choke coil 120 being connected in the lead 116 between condensers 121 arranged in parallel between the leads 116 and 117. The solenoid 58 is connected to the lead 116 by means of a lead 123 and to the lead 117 by means of a lead 124, a switch 125 being interposed between the lead 117 and the lead 124.

The motor 28 is of the reversing type and is connected to the end of the lead 116 at 127. The energization of the motor is controlled by a dual segment switch 129 and a dual segment rheostat 130, the dual segment switch 129 having a wiper arm 132 which is connected to the motor 28 by means of a lead 133, its left-hand segment being connected to the motor through a lead 134 while its right-hand segment is connected to the motor 28 through a lead 135 which taps into a lead 136. A wiper arm 137 of the rheostat is connected to the end of the lead 117, its left-hand segment being connected to the end of the lead 136 while its right-hand segment is connected by a lead 138 which is tapped into the lead 134 to the motor 28.

The second control housing 13 is substantially square in configuration and is connected to the first scale containing housing by means of a flexible conductor 139. The housing 13 provides a chamber 140 in which are disposed the solenoid control switch 125 which constitutes the second control means, and the motor control switch 129 and the rheostat 130 which constitute the first control means. It will be noted that the solenoid switch 125 is controlled by a lever 141 mounted on a switch shaft 142 while the movement of the wiper arms 132 and 137 of the motor switch 129 and rheostat 130, respectively, is controlled by a lever 143 mounted on a shaft 144 which is common to both of the wiper arms 132 and 137. Thus, the movement of the lever 143 will cause the concomitant movement of the switch and wiper arms 132 and 137 in the same direction at the same time.

When it is desired to cause the simultaneous rotation of the rotatable members 88, 92 and 98, the lever 143 is depressed in the appropriate direction to cause the wiper arms 132 and 137 of the motor switch 129 and the rheostat 130, respectively, to be carried to either the right-hand or left-hand segments thereof to cause the motor to be energized to rotate the members 88, 92 and 98 in either a clockwise or counterclockwise direction. When the motor 28 is so energized, the shaft 31 is rotated to cause the concomitant rotation of the pulleys 33 and 40 through the belt 41 and causing also the rotation of the first pinion 43. Since the solenoid 58 has not been energized, the compression spring 63 maintains the second pinion 46 at the upward limit of its movement so that the annular clutch 49 is maintained in continual contact with the under side of the first pinion 43, thus establishing a driving relationship between the first pinion 43 and the second pinion 46. Therefore, when the primary drive shaft 35 is rotated by the energization of the motor 28, the first pinion 43 causes the rotation of the second or intermediate spur gear 73 while the second pinion 46, being operatively connected to the under side of the first pinion 43 by means of the clutch annulus 49, is driven thereby to cause the concomitant rotation of the first spur gear 70. When the spur gear 70 is so rotated, it causes the concomitant rotation of the counter pinion 84 which, in turn, rotates the countershaft 80 and the counter pinion 86 mounted upon the upper end thereof to cause the concomitant rotation of the third, uppermost spur gear 77.

Although the first control has been described as including the switch and rheostat 129 and 130, to control the energization of the motor 28 it is conceivable that other forms of control and motors might be utilized, such as two Selsyn motors substituted for the first control means and the motor 28.

When the first, second and third spur gears 70, 73 and 77 are thus rotated, the first, second and third rotatable members 88, 92 and 98 connected thereto are rotated in unison at the same speed and in the same direction, it being understood that the direction of movement can be altered by the appropriate shifting of the lever 143 mounted on the control housing 13. It should also be noted here that, although the rotatable members 88, 92 and 98 are shown in superimposed relationship with the shafts 65, 71 and 75 maintained with their axes oriented in a vertical direction, it is conceivable that the axes of the secondary shafts be oriented in a horizontal direction and the rotatable members 88, 92 and 98 be placed in side-by-side rather than in superimposed relationship, if such orientation is desirable.

In order that the rotatable members 88, 92 and 98 may be differentially rotated, the solenoid 58 is energized through the actuation of the solenoid switch 125 by means of the lever 141 mounted on the control box 13, said energization of the solenoid 58 causing the downward movement of the armature 57 and urging the collar 55 downwardly against the bias of the compression spring 63 to permit the second pinion 46 to drop downwardly and carry the clutch annulus 49 away from engagement with the under side of the first pinion 43 thus breaking the driving engagement between the first and second pinions 43 and 46.

Simultaneously, the brake 61 on the opposite end of the lever 53 is carried upwardly against the under side of the first spur gear 70 to prevent the inadvertent rotation of the first and third spur gears 70 and 77, respectively, since, when the movement of the first spur gear 70 is retarded the third spur gear 77 is prevented from moving by the driving-driven relationship established between these gears through the countershaft 80. Therefore, while the first and third spur gears 70 and 77 are restrained against movement, the second, intermediate spur gear 73 is rotated by means of the first pinion 43 to a desired position. Subsequently, after the movement of the intermediate spur gear 73 and its associated rotatable member 92 has been accomplished, the solenoid 58 is de-energized by appropriate movement of the control lever 141 to permit the concomitant rotation of the members 88, 92 and 98 in the desired direction.

In order to illustrate the manner in which the slide rule 10 can be utilized in solving slide rule problems, the C and D scales of the slide rule have been represented in Figs. 7, 8 and 1 of the drawings in the positions which they assume during the solution of a simple problem. To solve the problem 2×3, it is necessary to rotate all of the rotatable members simultaneously so that the numeral 2 on the D scale is visible through the viewing opening 16, as best shown in Fig. 7 of the drawings. Subsequently, as best shown in Fig. 8, the intermediate scale 95 is rotated, as previously disclosed and described, to bring the index on the C scale opposite the numeral 2 on the D scale. All of the scales are then simultaneously rotated until the numeral 3 of the C scale is at the reference line 19. The answer 6 may then be read on the D scale.

Another example, not illustrated in the drawings, of the solution of a more complex problem involving the ascertainment of the answer to the fraction $$\frac{2\times 3\times 5}{1.5\times 8}$$

involves the following steps:

All of the scales are rotated simultaneously so that 2 on the D scale is visible. The second rotatable member 92 is then rotated differentially with respect to the first and third rotatable members 88 and 98, respectively, to bring the index on the C scale opposite the numeral 2 on the D scale. Subsequently, all three of the rotatable members are simultaneously rotated so that the numeral 3 on the C scale is positioned at the reference line 19. The second rotatable member 92 is then differentially rotated with respect to the other scales which are held against rotation so that the numeral 15 on the C scale is brought under the reference line 19. All of the scales are then rotated in a counterclockwise direction until the numeral 5 on the C scale is registered with the line 19. The second rotatable member 92 is then rotated until the numeral 8 on the C scale is registered with the line 19 and then all of the scales are rotated until the index of the C scale is registered with the line 19. The answer, 2.5, can then be read on the D scale opposite the index on the C scale.

I thus provide by my invention a slide rule which is controllable from a remote point by only one hand of the user so that computations may be written down without releasing the slide rule control. Furthermore, my invention permits involved calculations to be made more quickly than with conventional slide rules since the scales thereof are readily rotatable with reference to one another and can be quickly rotated to obtain the desirable results once the mode of actuation of the slide rule is mastered. Because of the circumferential length of the scales, greater accuracy is obtainable. For instance, eight-inch diameter scales would yield greater accuracy than a twenty-four inch long conventional slide rule.

I claim as my invention:

1. In a slide rule, the combination of: a housing; a plurality of differentially rotatable, cylindrical members mounted in said housing, said members bearing indicia upon the peripheral portions thereof; a motor in driving engagement with said members for rotating said members; brake means for releasing at least one of said members from driving engagement with said motor and preventing rotation of said member with reference to others of said members; a first remote control for energizing said motor to simultaneously rotate said members; and a second remote control for energizing said brake means to prevent rotation of said member with reference to others of said members.

2. In a slide rule, the combination of: a cylindrical housing providing a viewing window in the side wall thereof and having a reference line extending vertically across said window; a plurality of cylindrical members mounted in said housing concentrically therewith and differentially rotatable with respect to said reference line, said members bearing upon their peripheral portions vertically oriented indicia perceptible through said window; a motor for rotating said members; means for preventing rotation of at least one of said members with reference to others of said members; a first remote control for energizing said motor to simultaneously rotate said members; and a second remote control for energizing said means to prevent rotation of said member with reference to others of said members.

3. In a remotely actuable slide rule, the combination of: a housing providing a viewing opening and having a reference point thereupon; a plurality of members mounted in said housing and differentially rotatable with respect to said reference point, said members bearing on their peripheral portions scales perceptible through said viewing opening; a reversible motor in said housing operatively connected to said members for rotating said members in either direction; brake means for releasing at least one of said members from operative engagement with said motor and preventing rotation of said member with reference to others of said members; a remotely positioned housing operatively connected to said first housing; a first control in said remotely positioned housing for energizing said motor for simultaneously rotating said members; and a second control in said remotely positioned housing for energizing said brake means to prevent rotation of at least one of said members with reference to others of said members.

4. In a slide rule, the combination of: a housing; a motor in said housing; a plurality of scales mounted for differential rotation in said housing; a plurality of drives operatively connecting said motor and said scales, said drives including a primary drive and a plurality of secondary drives mounting said scales, and said primary drive being continually and operatively connected to at least one of said secondary drives to cause the differential rotation of at least one of said scales with respect to others of said scales, the others of said secondary drives being operatively connectible to said primary drive to cause the concomitant rotation of all of said scales; electromagnetic means for throwing said primary drive into operative connection with said others of said secondary drives; and a first control for energizing said motor to actuate said drives for simultaneously rotating said scales.

5. In a slide rule, the combination of: a housing; a motor in said housing; a plurality of scales mounted for differential rotation in said housing; a plurality of drives operatively connecting said motor and said scales, said drives including a primary drive and a plurality of secondary drives mounting said scales and said primary drive being continually and operatively connected to at least one of said secondary drives to cause the differential rotation of at least one of said scales with respect to others of said scales, the others of said secondary drives being operatively connectible to aid primary drive to cause the concomitant rotation of all of said scales; a brake for preventing the rotation of the others of said secondary drives when not operatively connected to said primary drive; electromagnetic means for actuating said brake; a first control for energizing said motor to actuate said drives for simultaneously rotating said scales; and a second control for energizing said electromagnetic means to brake the others of said secondary drives while said one drive is actuated.

6. In a slide rule, the combination of: a housing; a motor in said housing; a primary drive shaft operatively connected with said motor; a first secondary drive shaft operatively connectable to said primary drive shaft; a second secondary drive shaft encompassing a portion of said first secondary drive shaft and operably connected to said primary drive shaft; a third secondary drive shaft encompassing a portion of said secondary drive shaft, said third secondary drive shaft being operatively connected with said first secondary drive shaft; a scale carried by each of said secondary drive shafts and rotatable therewith; and means within said housing for operatively connecting and disconnecting said first secondary drive shaft to said primary drive shaft.

7. A slide rule as claimed in claim 6 in which said housing is cylindrical and said secondary drive shafts extend axially within said housing.

8. A slide rule as claimed in claim 6 in which said means for operatively disconnecting said first secondary drive shaft from said primary drive shaft includes a lever carried by said primary drive shaft, a retractable armature pivotally connected to one end of said lever, and electromagnetic actuating means for retracting said armature.

9. A slide rule as claimed in claim 7 in which said scales are cylindrical and are rotatable within said housing.

10. A slide rule as claimed in claim 8 including control means without said housing for energizing said electromagnetic actuating means.

PAUL J. TOIEN.

References Cited in the file of this patent

UNITED STATES PATENTS

| Number | Name | Date |
| --- | --- | --- |
| 443,772 | Kells | Dec. 30, 1890 |
| 513,213 | Stanton | Jan. 23, 1894 |
| 1,083,597 | Cummings | Jan. 6, 1914 |
| 2,080,857 | Baer | May 18, 1937 |
| 2,134,901 | Wey | Nov. 1, 1938 |
| 2,285,774 | Horner | June 9, 1942 |
| 2,527,776 | Taafe | Oct. 31, 1950 |